United States Patent
Joglekar et al.

(10) Patent No.: US 10,769,699 B1
(45) Date of Patent: Sep. 8, 2020

(54) SYSTEM, METHOD, AND COMPUTER READABLE MEDIUM FOR PROVIDING TRAVEL ASSISTANCE

(71) Applicant: JPMorgan Chase Bank, N.A., New York, NY (US)

(72) Inventors: Ajinkya P. Joglekar, Philadelphia, PA (US); Manning R. Field, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 700 days.

(21) Appl. No.: 14/561,837

(22) Filed: Dec. 5, 2014

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0633* (2013.01); *G06Q 30/0639* (2013.01); *G06Q 30/0643* (2013.01)

(58) Field of Classification Search
CPC . G06Q 30/0631; G06Q 30/0601–0645; G06Q 30/0639; G06Q 30/0633; G06Q 30/0643
USPC ............ 705/26.1–27.2, 26.7, 26.9, 26.8
See application file for complete search history.

(56) References Cited

U.S. PATENT DOCUMENTS 8,326,793 B1 * 12/2012 Bowers ............... G06F 9/50
706/45
2003/0050854 A1 * 3/2003 Showghi ............ G06Q 10/02
705/15
2009/0276250 A1 * 11/2009 King ............... G06Q 10/02
705/5

(Continued)

OTHER PUBLICATIONS

Toronto Port Authority Partners with BLACK to Deliver Next-Generation Digital Advertising Experience at Billy Bishop Toronto City Airport. Canada NewsWire. Aug. 11, 2014 (Aug. 11, 2014). Accessed via ProQuest. (Year: 2014).*

(Continued)

*Primary Examiner* — Jeffrey A. Smith
*Assistant Examiner* — Allison G Wood
(74) *Attorney, Agent, or Firm* — Hunton Andrews Kurth LLP

(57) ABSTRACT

The invention relates to a computer-implemented system and method for providing travel information to a customer of a business such as a financial institution, according to one example. The method may comprise the steps of: acquiring customer profile data, acquiring customer location data, acquiring merchant location data within an airport, acquiring flight status data; acquiring product availability data; transmitting a first data set to the customer's mobile device after the customer arrives at the airport providing a departure time for the flight and a travel time period from a current location of the customer to a location of a departure gate; transmitting a second data set identifying amenities located along a route from the customer's current location to the departure gate, wherein the amenities are identified based on the customer profile data; and transmitting a third data set to the customer's mobile device comprising merchant product availability information and an invitation for the customer to order the product before arriving at the merchant.

18 Claims, 15 Drawing Sheets

(56) References Cited

U.S. PATENT DOCUMENTS

| | | | |
|---|---|---|---|
| 2012/0174015 A1* | 7/2012 | Erling | G06Q 10/10 715/771 |
| 2014/0156480 A1* | 6/2014 | Qaim-Maqami | G06Q 40/02 705/35 |

OTHER PUBLICATIONS http://web.archive.org/web/20131106123110/www.gateguru.com, "Travel. Reinvented.", May 16, 2017, pp. 1-3.

* cited by examiner

|  | Data types | Featured sets | Source |
| --- | --- | --- | --- |
| 312 | Profile | User data | FI profile service |
|  |  | Travel itinerary | Connexion platform |
|  |  | Activity log | Mobile device |
| 314 | Location | Airport | FlightStats |
|  |  | Amenities | FlightStats |
|  |  | Map | Bing, Google |
|  |  | Weather | FlightStats, AccuWeather |
|  |  | City Guide | Yelp, FourSquare, Google |
|  |  | Gate status | TSA |
| 316 | Transportation | Flight | FlightStats |
|  |  | Layover | FlightStats |
|  |  | Delays | FlightStats |
| 318 | Merchants | Offers and Rewards | Ultimate Rewards |
|  |  | Product availability | Partnerships |

Figure 3

SYSTEM, METHOD, AND COMPUTER READABLE MEDIUM FOR PROVIDING TRAVEL ASSISTANCE

FIELD OF THE INVENTION

The invention relates generally to a system and method for providing travel assistance, and more particularly to a system and method for enhancing a traveler's experience an airport by providing relevant, timely information and/or offers to the traveler's mobile device during the trip.

BACKGROUND

Various efforts have been made to devise a system that provides useful information to a traveler. For example, many airlines distribute software applications (also referred to as "apps") that run on a mobile phone or a tablet computer. These apps provide flight status information and gate information for the traveler. Other third party apps (such as Google Maps) provide navigation for a traveler driving from his or her home to the airport. However, the amount of information these apps provide can be rather limited. For example, the airline app may simply inform the traveler of the status of the flight (e.g., delayed by 25 minutes, canceled, on time, etc.) and the gate number. The Google Maps app may not work particularly well inside the airport building. Hence, the traveler's experience getting to a flight can often be unpredictable and stressful. Furthermore, in most cases, the traveler does not know how long it will take to walk to his or her gate of departure, or what stores and/or amenities will be nearby when he or she gets there. Consequently, to avoid missing a flight, the traveler may get to the gate very early only to find no desirable amenities nearby. These and other drawbacks exist in existing apps and systems.

It would be desirable, therefore, to have a system and method that enhanced the traveler's experience by providing useful, timely information about the timing and location of available services, vendors and other amenities, and location and timing information relative to the traveler's departure gate.

SUMMARY

According to one embodiment, the invention relates to a computer-implemented system and method for providing travel information to a mobile device of a customer of a business such as a financial institution. The method may be conducted on a specially programmed computer system comprising one or more computer processors, mobile devices, electronic storage devices, and networks. The method may comprise the steps of: acquiring customer profile data, wherein the customer profile data comprises historical data on financial transactions executed by the customer; acquiring customer location data, wherein the customer location data is provided by the customer's mobile device; acquiring amenities location data within an airport, wherein the amenities comprise a plurality of merchants; acquiring flight status data for a flight at the airport booked by the customer; acquiring product availability data from at least one of the plurality of merchants; transmitting a first data set to the customer's mobile device after the customer arrives at the airport, wherein the first data set provides a departure time for the flight and a travel time period from a current location of the customer to a location of a departure gate; transmitting a second data set to the customer's mobile device, wherein the second data set identifies amenities located at the customer's current location, located along a route from the customer's current location to the departure gate, and located at the departure gate, and wherein the amenities are identified based on the customer profile data; transmitting a third data set to the customer's mobile device, wherein the third data set comprises merchant product availability information and an invitation for the customer to order a product before arriving at the merchant; and if the customer decides to order the product, receiving from the customer an order for the product and an authorization to charge an account at a financial institution, and relaying the order to the merchant.

The invention also relates to a computer implemented system for providing travel information to a mobile device of a customer of a business such as a financial institution, and to a computer readable medium containing program instructions for executing a method for providing travel information to a mobile device of a customer of a business.

The computer implemented system, method and medium described herein can provide the advantage of significantly enhancing customer loyalty to a business such as a financial institution, based on the perception that the business is significantly upgrading the customer's experience through the airport. By gathering and processing various data sources that are relevant and valuable to the customer, and sending the customer relevant information on merchants, offers, timing, and navigation through the airport tailored to the customer's profile, the business can guide the customer to desirable amenities tailored to his or her profile, enhance the customer's enjoyment of the travel experience, and assist its customer in avoiding waiting time and unwanted merchants. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 illustrates an example of data types, featured data sets, and data sources that can be used with the travel system.

DETAILED DESCRIPTION

Figure 1:
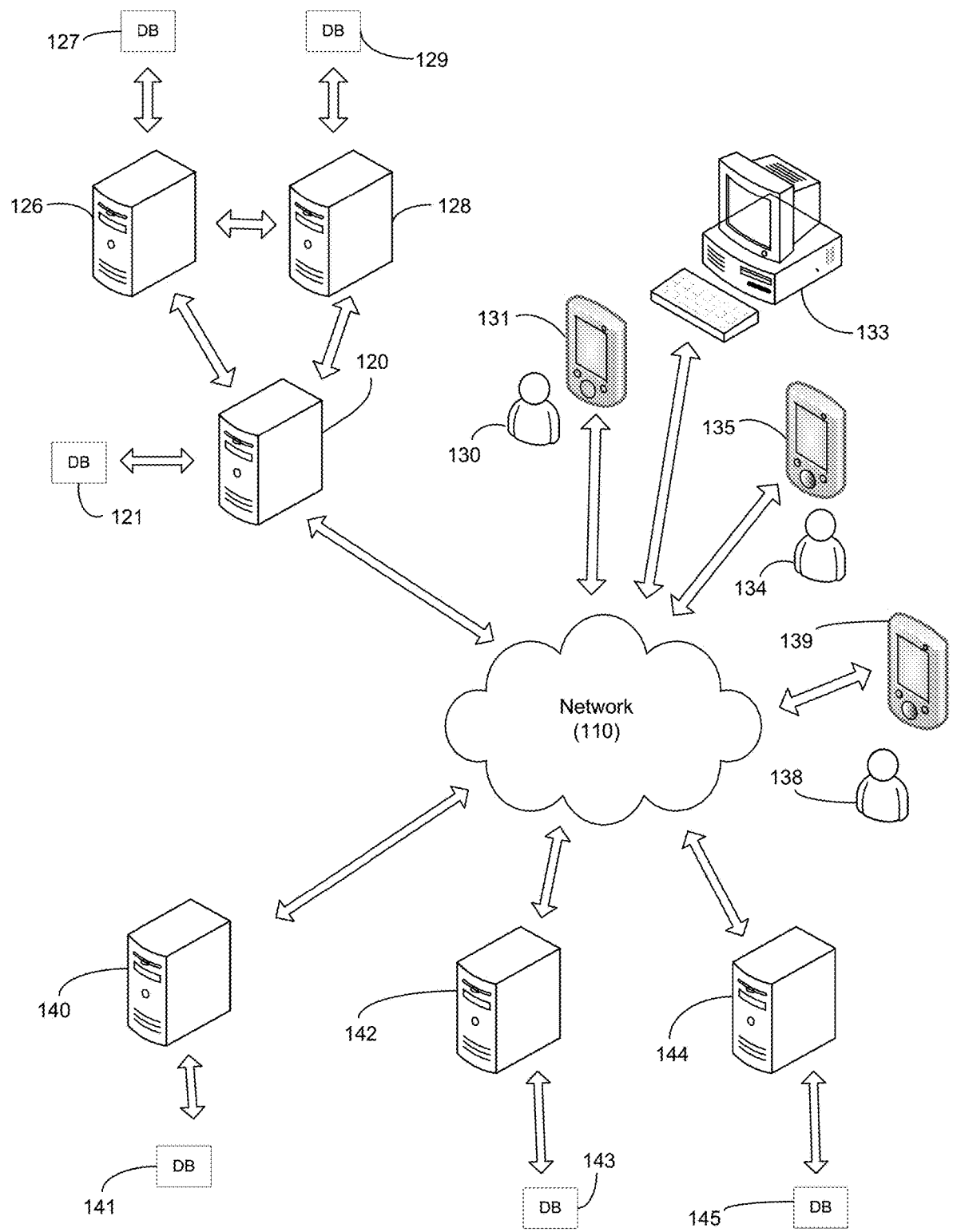
FIG. 1 is a diagram of a system for providing travel assistance according to one embodiment of the invention.

FIG. 1 is a diagram of a system for providing travel assistance to a customer of a business such as a financial institution according to an exemplary embodiment of the invention. As shown in FIG. 1, the system may include one or more computer servers and networks. The system may be provided by a business or entity that has access to relevant information to enhance the customer's experience. According to one embodiment, the travel system is operated and maintained by a financial institution such as retail bank using, in part, data on travelers that are its retail bank customers. For simplicity, the examples set forth herein will be described in terms of a system operated by a financial institution (sometimes abbreviated herein as "FI") for traveling through an airport. However, those skilled in the art will appreciate that other types of companies or businesses can operate and maintain the travel system for the benefit of their respective customers, and the system can be adapted for use at facilities other than airports.

Referring again to FIG. 1, the system may be embodied primarily or entirely in a travel server 120, which may include a database 121, owned and/or operated by the financial institution that interfaces with a number of other servers and entities via one or more networks 110. The network 110 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The travel server 120 that is used by the financial institution can provide timely, relevant travel information to its customers, such as credit card holders, 130, 134, 138. The travel server 120 can interface with other servers owned and/or operated by the financial institution. For example the travel server 120 may interface with a credit card server 126 and associated database 127 that stores and processes credit card transactions for credit card holders of the financial institution. The travel server 120 may also interface with a rewards program server 128 and associated database 129 that stores and processes rewards information for account holders at the financial institution. The foregoing description is merely one example of a configuration for such systems and functions and is not intended to be limiting.

Also shown in FIG. 1 is an account holder 130 of the financial institution who may communicate electronically with the travel server 120 of the financial institution using a mobile device 131 and/or a personal computing device 133. The mobile device 131 may comprise a smart phone, such as an Apple iPhone, Samsung Galaxy, or Amazon Fire Phone, or a tablet computer, such as an Apple iPad or Samsung Galaxy Tab, that includes a touch screen or other interactive display. The mobile device 131 preferably includes hardware and software to enable communication with a cellular network, a WiFi network, and a Bluetooth channel. The personal computing device 133 may comprise a laptop computer or desktop computer, for example. The account holder 130 may use the personal computing device 133 to execute various online banking transactions with the financial institution at home. FIG. 1 shows two other customers 134, 138 of the financial institution, who may communicate with the financial institution with their mobile devices 135, 139 and with personal computing devices (not shown).

FIG. 1 illustrates additional servers operated by other entities that have information relevant to the customers 130, 134, 138 of the financial institution. According to one embodiment of the invention, the server 140 and associated database 141 may be a flight information server that compiles and distributes flight status information, such as flight cancellations, flight delays, gate numbers, layover information, and weather reports. One example of a company that operates such a server is FlightStats, Inc. (www.flight-stats.com), and other similar existing or future services can be utilized in connection with various embodiments of the invention. The server 142 and associated database 143 may be a server operated by a search engine or web service that compiles and distributes maps, city guides, merchant reviews, and other information relevant to the customers 130, 134, 138, for example. Examples of companies that operate such servers include Bing, Google, and Yelp, and other similar existing or future services can be utilized. The server 144 and associated database 145 may be a transportation server operated by an agency such as the Transportation Security Administration (TSA) or similar organization that compiles and distributes gate status information, for example. The servers 140, 142, 144 can be linked to the travel server 120 of the financial institution through a public or private network.

Figure 2:
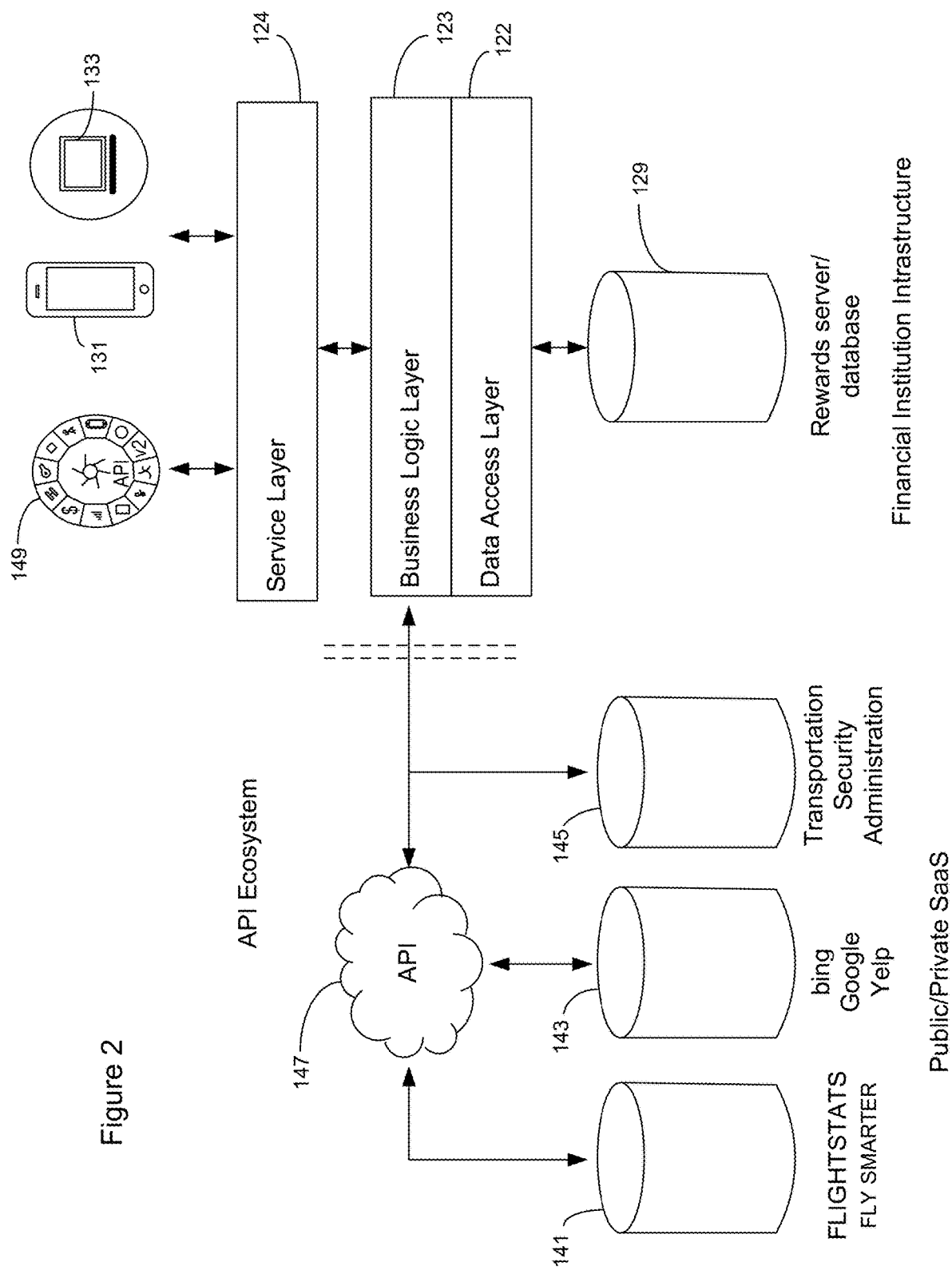
FIG. 2 illustrates an example of certain data sources and software application layers for the travel system.

FIG. 2 illustrates the interfaces between the various servers in FIG. 1 and the application layers of the travel system software according to one embodiment of the invention. As shown in FIG. 2, there are a number of application layers 122, 123, 124 within the travel server 120. Each application layer may comprise one or more software code modules designed to perform a specific function or functions.

The travel server 120 may include a data access layer 122 comprising software code that controls access to data of the financial institution such as the credit card transaction data stored in the credit card database 127 and the rewards program data stored in the rewards database 129.

The travel server 120 may also store and execute a business logic layer 123 comprising software code that controls the processing of the various data sources for each customer, including the financial institution data sources 127, 129 and the third party data sources 141, 143, 145. The third party data sources 141, 143, 145 may comprise a public or private system or service, such as software-as-a-service (SaaS), and may interface with the business logic layer 123 through an application programming interface (API) 147. As will be described further below, the business logic layer 123 receives data from a number of sources as input and, based on customer preferences and business rules, calculates relevant, timely information for the customer.

The service layer 124 receives information from the business logic layer 123 and formats and transmits the information to the customer's mobile device 131. The service layer 124 also receives information from the customer's mobile device 131 and personal computing device 133. The service layer 124 may also exchange information with various other systems through application programming interfaces (APIs) 149.

FIG. 3 illustrates an example of data sets that can be used to provide relevant, timely information to a customer according to an exemplary embodiment of the invention. As shown in FIG. 3, the data types 310 may include profile data 312, location data 314, transportation data 316, and merchant data 318, according to one example. Within each data type 310, there are featured data sets 320 from various data sources 330.

The profile data 312 include data specific to the customer. The profile data 312 may include data stored by the financial institution or other business on the customer's preferences and transaction history and geographic and demographic data. The financial institution may have a significant amount of data on the customer's past transactions, creditworthiness, travel preferences, and other preferences and data that enable the financial institution to customize the information it sends to the customer during his or her trip. The profile data 312 will also generally include the customer's travel itinerary, which may be obtained by the financial institution in different ways. For example, the financial institution may obtain the customer's itinerary if the customer books the trip using the financial institution's rewards system 128. Or, the financial institution may utilize an internal or third party system that utilizes email scrubbing and/or parsing to derive the customer's itinerary from his or her email communications with the airline, hotel and rental car companies, for example. One example of such a third party system is the Tripit system of Concur Technologies, Inc., and other similar systems can be utilized. The profile data may also include an activity log from the customer's mobile device 131. The activity log may include information such as what websites the customer has visited recently, what apps he or she has used, where he or she has traveled, and biometric information as collected by the mobile device and any peripherals. Together, these data sets under the profile data type can provide relevant information to the financial institution to allow it to customize the recommendations, products, services, and discounts it may offer to its customer during his or her trip.

FIG. 3 also illustrates a number of examples of data sets under location data type 314. According to one particular example, the travel system 120 may use airport data provided by FlightStats, map data provided by Bing or Google, weather data provided by FlightStats or Accuweather, a city guide provided by Yelp, FourSquare, or Google, and gate status information provided by the Transportation Security Administration (TSA). Other similar services, systems and data sources can also be used based on the objectives of the entity operating the travel system.

Transportation data type 316 may include flight, layover, and delay data sets provided by FlightStats or a similar system. The travel system 120 may use these data sets to push updates to the customer's mobile device 131 regarding flight status and timing information.

FIG. 3 also shows a merchant data type 318. According to one embodiment, the merchant data type may include offers and rewards data from the financial institution's rewards database 129, and product availability data based on partnerships or agreements with various merchants at the airport. Although the data types, featured data sets, and data sources depicted in FIG. 3 provide one detailed example, other embodiments of the invention may utilize additional or different data types, data sets and data sources existing or developed in the future, as desired by the entity operating the travel system.

Having described an example of the hardware, software, and data that can be used to run the travel system, an example of the method and customer experience will now be described.

One objective of various embodiments of the invention is to give the customer of the financial institution a mobile app to provide personalized recommendations during his or her time at the airport. The travel system may be configured to: push content to the customer so he or she can stay updated, highlight the more important aspects of the trip, (e.g., check-in, gates, time until boarding, etc.), present personalized lists of points of interest (rather than complete maps), and utilize common symbols (e.g., AIGA standard) with labels for ease of use. The travel system may be designed to accentuate the positive aspects of the travel experience, orient the travel experience around the time that is available, leverage relationships defined by itineraries and by the customer's profile, provide location-specific messaging, and monitor personal biometrics such as walking pace, to provide a customized and useful app for the customer that enhances the customer's experience.

Initially, the financial institution may send its customer an offer to download the travel app, either by email, text, or a personalized message on a website. The financial institution may send that offer message to all or a certain subset of its customers, e.g., card holders of a particular type of credit card. According to one embodiment, the financial institution sends the offer message to its customer after he or she has booked a trip using the financial institution's credit or debit card, rewards program, and/or rewards points. The message may indicate that the app can assist the customer by: tracking his or her itinerary and destination details, notifying the customer of any significant changes, delivering concourse directions with timing to the gate, and providing insider tips and offers for his or her trip. The message may invite the customer to download the app for the upcoming trip.

The message may also invite the customer to invite the rest of the party, e.g., his or her family members for a family vacation, or business colleagues for a business trip. If the customer invites other members, then the travel app can customize the travel experience using profile data, location data, transportation data, and merchant data relevant to all the members of the party and the travel app can communicate will each family member's mobile device prior to and during the trip.

Once the customer of the financial institution has downloaded the travel app, the travel app can present a set of questions on the customer's mobile device 131 about the travel behaviors of the customer and his or her family members or business colleagues. This information allows the travel app to create a profile that can be used to customize the customer's travel experience. For example, the travel app may ask the customer when he or she likes to arrive at the airport, e.g., right on time, or with plenty of time to spare. To enhance the personal aspect of the travel app, these options can be presented using pictures that the customer selects, e.g., a picture of a couple running to the security line (arrive right on time), or a picture of a person lounging in a chair (arrive with plenty of time to spare).

Next, the travel app may ask the customer what type of traveler he or she is, showing a first picture of a suitcase overflowing with unfolded clothes, and a second picture of all items of clothing, toiletries and other travel accessories folded and neatly arranged and organized prior to packing for the trip. The customer may select the picture that best matches his or her personality, which provides the travel app and financial institution with data about the customer's preferences that can be used to customize recommendations and offers sent to the customer and his or her party members.

As part of the initial set of questions to establish the customer's profile, the travel app may ask the customer how he or she likes to spend his or her free time, presenting a first picture of a person reading a book and a second picture of a person watching TV on a couch. The travel app may ask the customer about food preferences, showing a first picture of a pizza and a second picture of sushi. The travel app may ask the customer about preferences for spending free time at the airport, presenting a first picture of drinks at a bar, and a second picture of a person reading quietly in a less crowded part of the airport. In each case, the customer's selections (e.g., selected by tapping on one of the pictures) provide useful data to allow the financial institution to refine the customer's profile data and customize the information and offers provided to the customer through the travel app.

Figure 4:
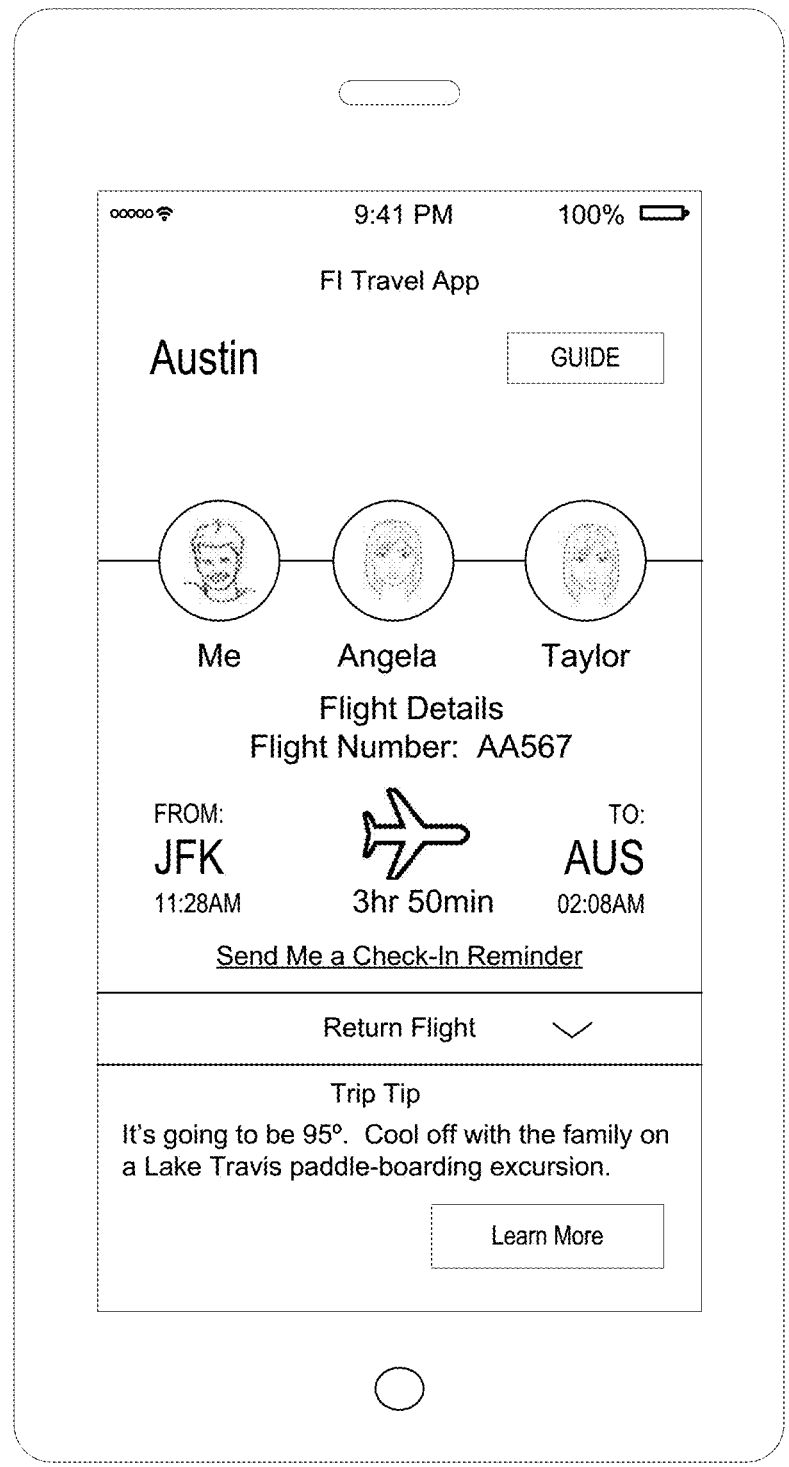
FIG. 4 is an example of a summary of the customer's trip that may be displayed on the customer's mobile device before the customer begins the trip.

According to one embodiment of the invention, prior to the trip, the travel app sends a reminder notification to the customer's mobile device 131 that presents the full itinerary and suggestions for things to bring or do. Referring to FIG. 4, the reminder notification may present information such as the travel destination, a button to request a travel guide for the destination city, members of the traveling party (e.g., family members) that have been identified by the customer, flight details including flight number, departure airport, departure time, arrival airport, arrival time, and flight duration for outbound and return flights, and trip tip, e.g., the weather at the destination airport and a recommended a family excursion based on profile information. The travel app may also present a "Learn More" button that the customer can click on if he or she would like more information on the recommended trip tip. The travel app may also present a link that the customer can click on to request that the travel app send the customer a check-in reminder.

Figure 5:
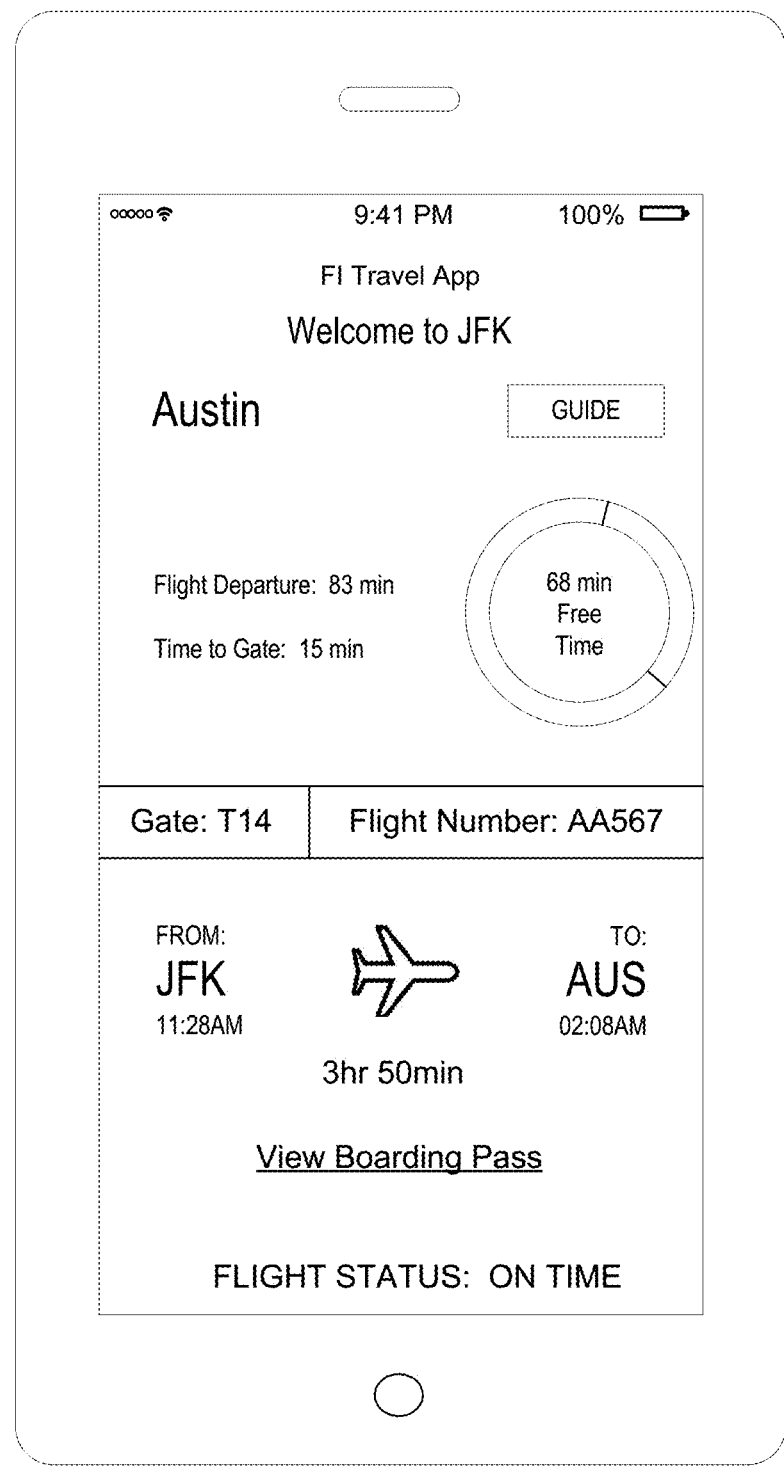
FIG. 5 is an example of a welcome screen that the travel app can present to the customer upon arrival at the airport.

Referring to FIG. 5, when the customer and his or her family arrive at the airport, the travel app can send a message welcoming them to the airport and providing their flight details and other relevant information. According to one example shown in FIG. 5, the travel app may present a welcome message ("Welcome to JFK"), display the vacation destination ("Austin") and provide a button with a link to a travel guide for the destination ("Guide"). The travel app may also display the time remaining until departure (83 minutes), the time it will take to walk to the gate (15 minutes), and the amount of free time (68 minutes) according to one example. The time to walk to the gate can be calculated by the travel app (e.g., by the business logic layer 123 shown in FIG. 2) by determining the gate location, the location of the customer's mobile device 123, the airport layout, the distance to be traveled, and the customer's estimated walking speed. The travel app can be designed to convey a positive message, e.g., by featuring the amount of free time prominently (68 minutes).

The travel app can also provide other useful information such as the gate number, the flight number, the departure time, the arrival time, the flight duration, and the flight status, according to an exemplary embodiment of the invention. The travel app may include a link to an electronic boarding pass ("View Boarding Pass"), either directly, or through another app or website such as Apple's Passbook or an app or website of the financial institution or other business. The information provided by the welcome screen shown in FIG. 5 can be a collection of helpful, timely information that gives the customer all the relevant information that he or she needs upon arriving at the airport to provide a degree of control over a situation that may otherwise be stressful and unpredictable.

The travel app, according to another aspect of the invention, may assist the customer in identifying amenities and vendors that are located along the way from the customer's present location to the departure gate. As shown in an example in FIG. 6, a portion of the screen is entitled "JFK Amenities." This section of the screen identifies the number of amenities that are near the customer's current location ("AROUND YOU"), the number of amenities that are in the airport along the way to the gate ("ON THE WAY"), and the number of amenities that are at the gate ("AT GATE"). By tapping on the numbers (6, 4 or 3 in this example), the customer is able to obtain a list of those amenities identified by the travel app. The amenities listed can be all amenities in the relevant location, or they can be only those amenities that match the customer's and family members' profiles. For example, the travel app may be configured to only display those amenities that are consistent with at least one family member's profile. According to one example, if all the family members are health conscious, then the travel app would not recommend or list any fast food restaurants serving only high calorie food items.

Figure 6:
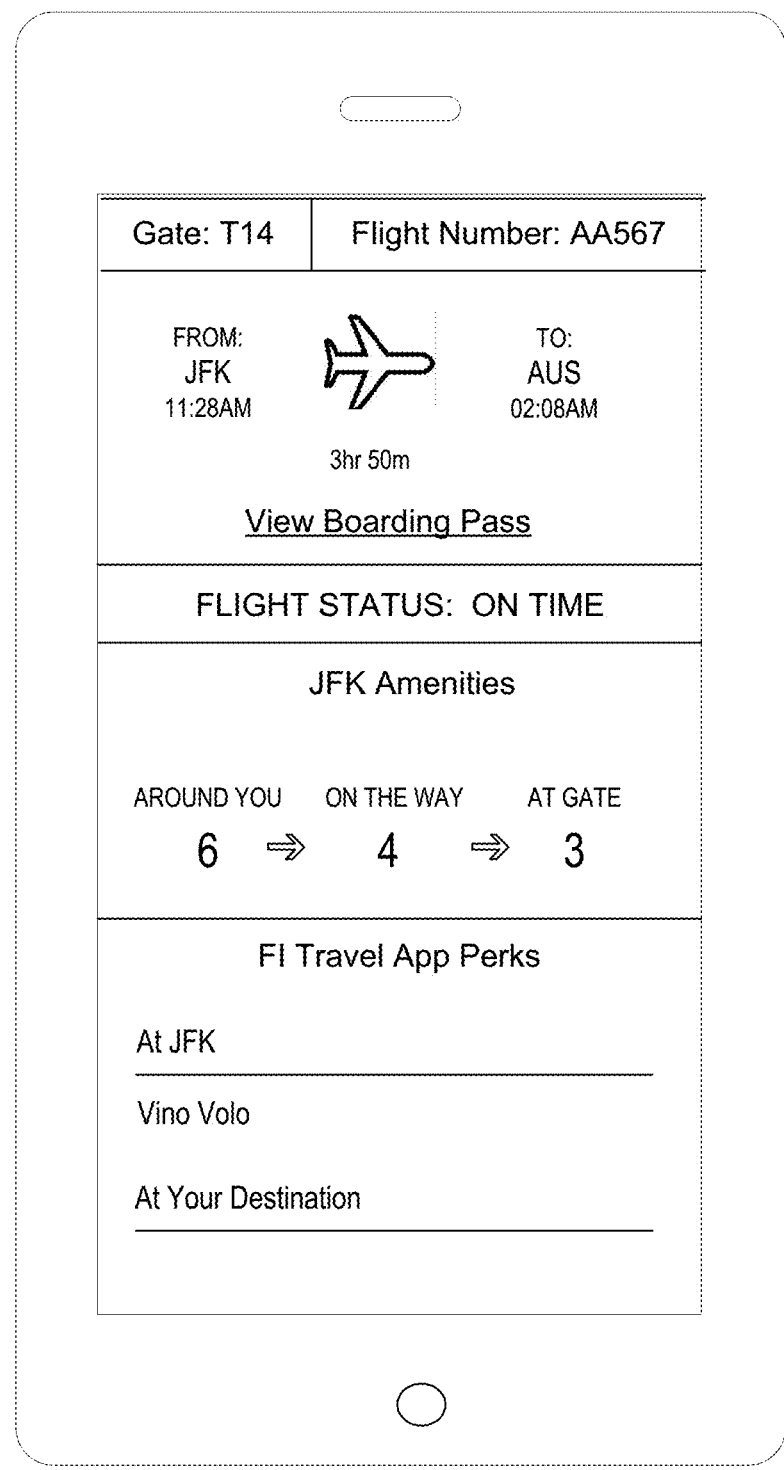
FIG. 6 illustrates an example of a screen that identifies various amenities at the customer's current location, along the way from the customer's current location to the departure gate, and at the departure gate.

FIG. 6 also shows an example of a special offer offered by the financial institution to the customer under an appropriate heading ("FI Travel App Perks" in this example). As shown in the example in FIG. 6, the travel app presents the opportunity for the customer to benefit from a special offer at a Vino Volo at JFK Airport. The customer is able to obtain details on the special offer by tapping the Vino Volo link. The special offer may include free or discounted products or services, for example. The financial institution may present the special offer based on the customer's profile so as to maximize the likelihood that the customer will take advantage of the special offer.

Figure 7:
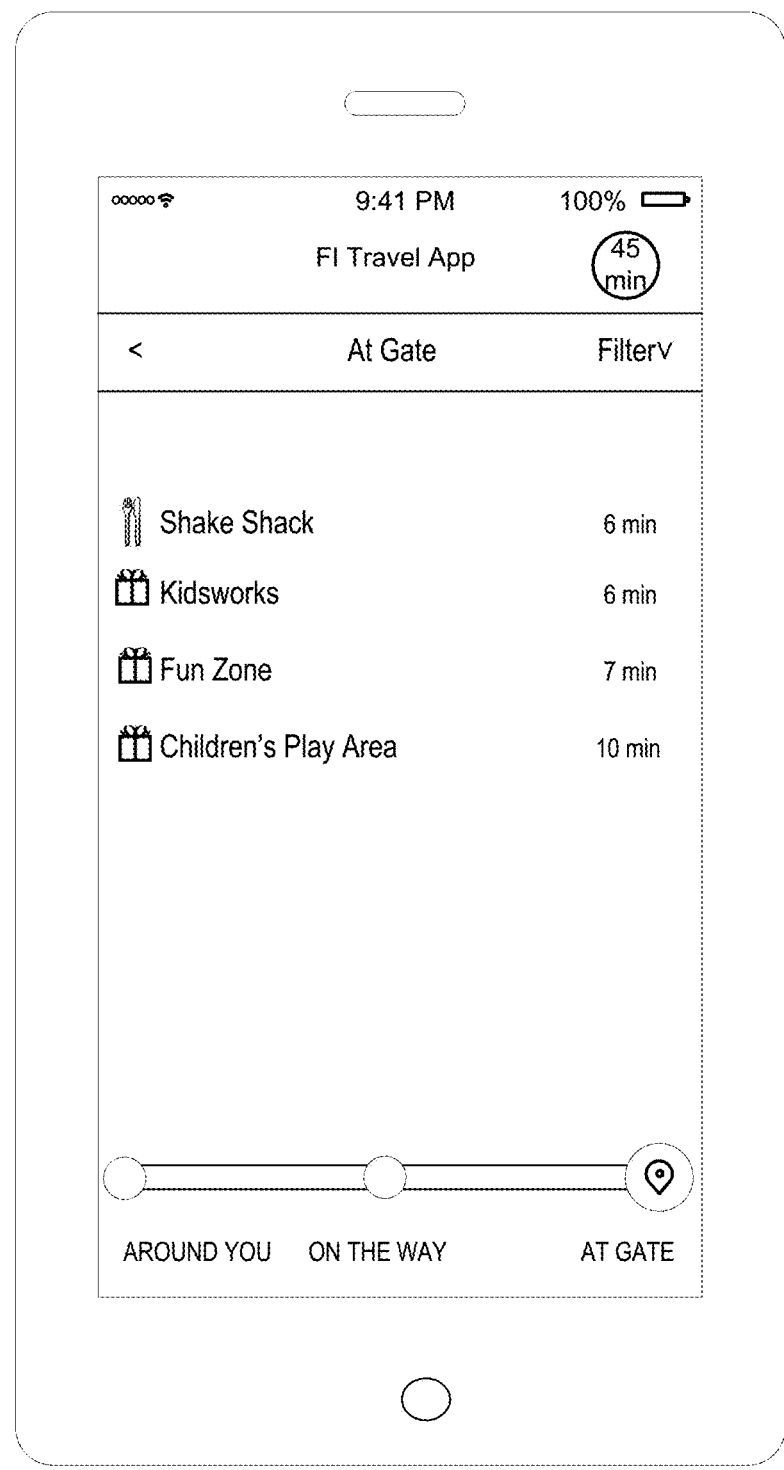
FIG. 7 is an example of a screen that identifies certain amenities at the customer's departure gate.

FIG. 7 shows an example of a list of amenities that the travel app can identify if the customer requests such information. As used herein, "amenities" refers to a business or facility that provides a product, service or other benefit or experience to the customer. In this example, the customer has requested the list of amenities at the gate, and the travel app identifies a number of vendors, services, and other amenities at the customer's gate, such as Shake Shack, Kidsworks, Fun Zone, and a Children's Play Area. The travel app also presents an indication of the time it will take the customer to get to each amenity, and an indication of the free time before departure (45 minutes in this example). At the bottom of the screen, the travel app includes an icon that can be moved by swiping from "AT GATE" to "ONE THE WAY" to "AROUND YOU" to show the amenities close to each location. This screen allows the customer and his or her party to decide whether to go directly to the gate or stop along the way based on amenities identified by the travel app and correlated or related to the profiles of the family members.

Figure 8:
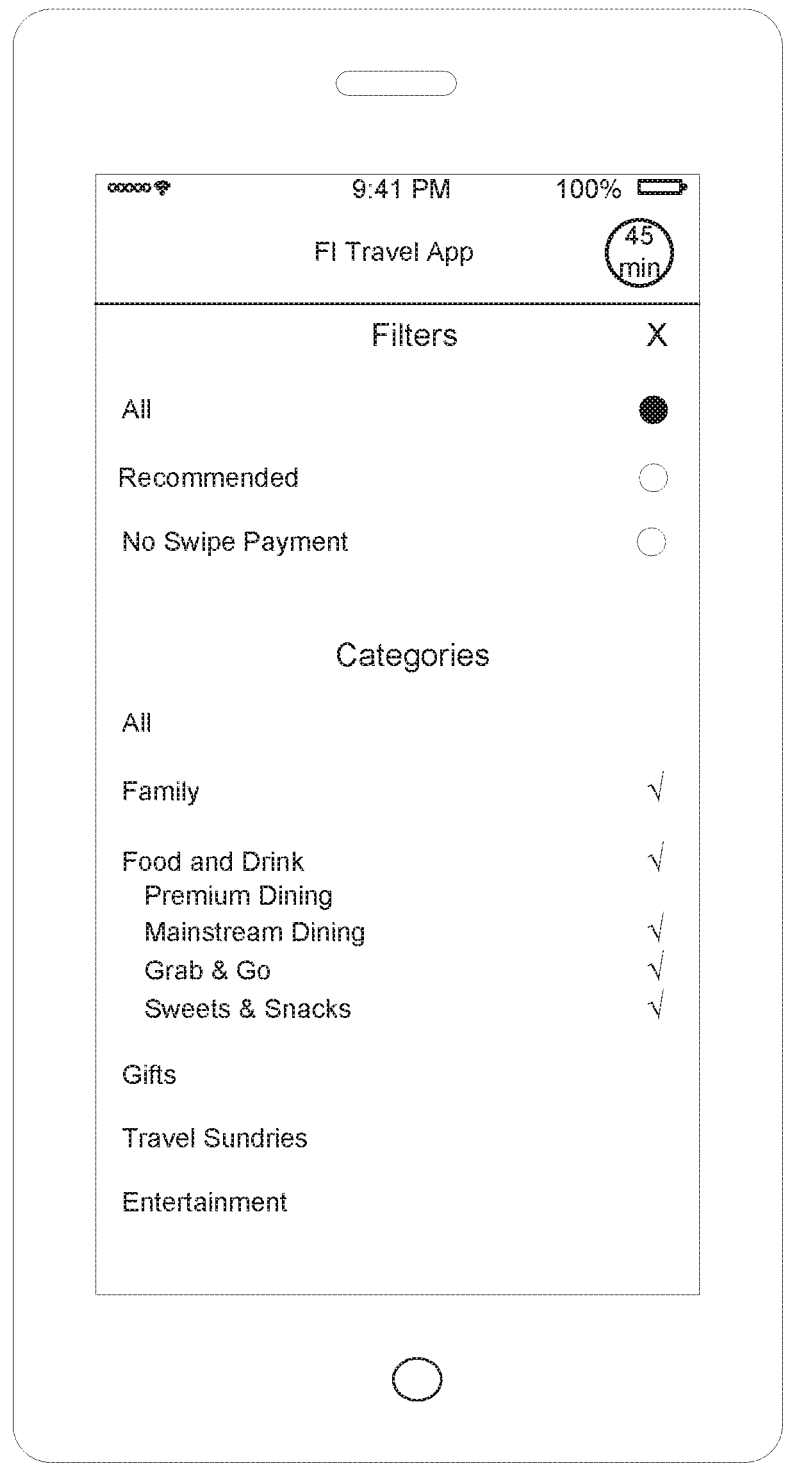
FIG. 8 is an example of a screen that allows the customer to select certain filters and categories used to customize the recommendations provided to the customer by the travel app.

FIG. 7 also includes a heading entitled "Filter" and an adjacent down arrow (∨). The travel app allows the customer, by tapping on the down arrow (∨) to view the filers that are being applied to the information transmitted to the customer by the travel app. FIG. 8 shows one example of these filters. As shown in the FIG. 8 example, the filter may be set at "All," "Recommended" or "No Swipe Payment." The "All" setting means that all amenities are presented by the travel app to the customer. The "Recommended" setting means that only those amenities recommended by the travel app based on the customer's profile are presented to the customer. The "No Swipe Payment" setting means that the vendor will accept payment by a mechanism other than swiping the magnetic stripe of a credit card or debit card. Examples of no swipe payment mechanisms include radiofrequency (RF) communication, NFC communication, and QR codes or by providing customer's payment information directly to merchant via backend processes. The customer can select the desired filter by tapping the buttons on the right side of the screen.

Also shown in FIG. 8 are categories of amenities that may be presented to the customer by the travel app. According to this example, the customer may specify "All" if he or she does not want any amenities filtered out. The customer may also select which amenities he or she would like to see, such as Family amenities, different types of Food and Drink amenities, Gifts, Travel Sundries, Entertainment, and so on, by tapping on the check mark at the right of the screen to turn it on or off. In this way, the customer can control the filtering of which amenities are presented to him or her by the travel app, which allows for customized recommendations.

Figure 9:
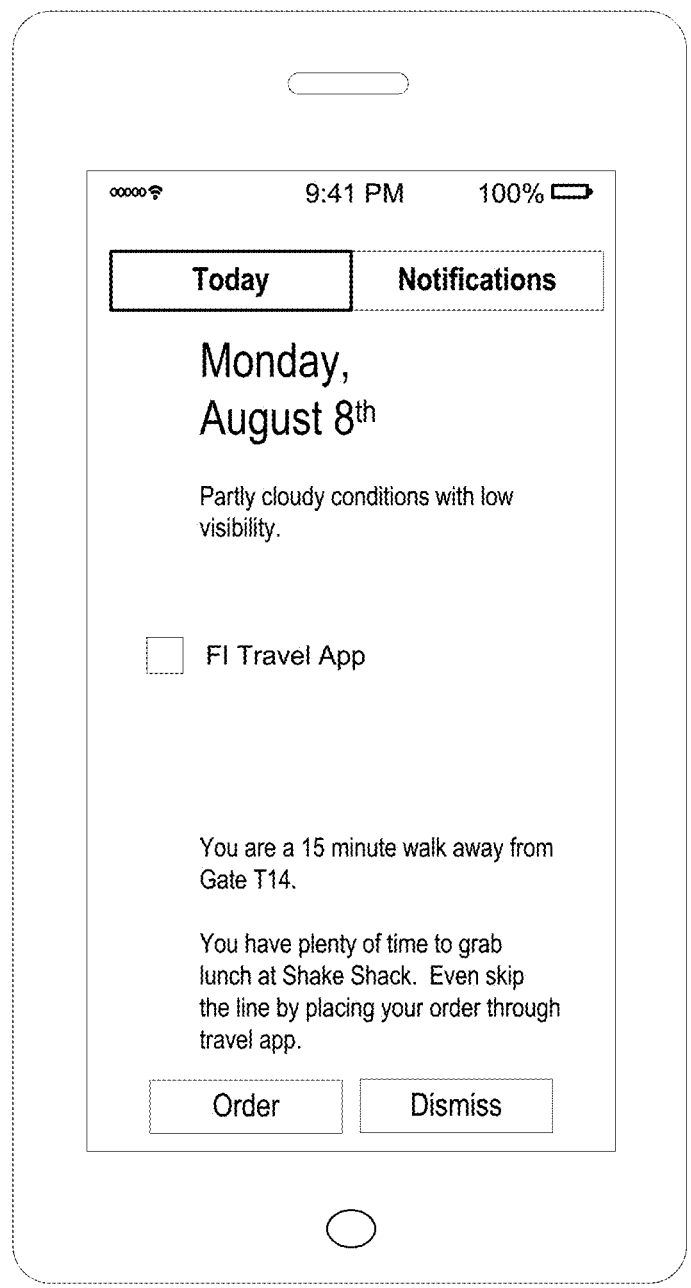
FIG. 9 is an example of a screen that allows the customer to pre-order certain available products at a merchant identified by the travel app.

FIG. 9 shows one example of a push notification to the customer's mobile device 131 based on the circumstances he or she is in. Such push notifications can be made, for example, when the customer is idle rather than moving, when the customer is approaching points where directional decisions must be made, and/or when the customer is approaching items of particular relevance to him or her. In this example, a push notification is sent to the customer's mobile device 131 indicating the walking duration to the gate and the gate number. The push notification also provides a recommendation for a restaurant (e.g., Shake Shack) based on the customer's profile and the available time until departure. The push notification also provides an opportunity for the customer to skip the line at the restaurant by placing an order through the travel app. In this example, the customer can tap the button entitled "Order," or a separate "Shake Shack" link, and is then routed to a screen with more specific information on the vendor.

Figure 10:
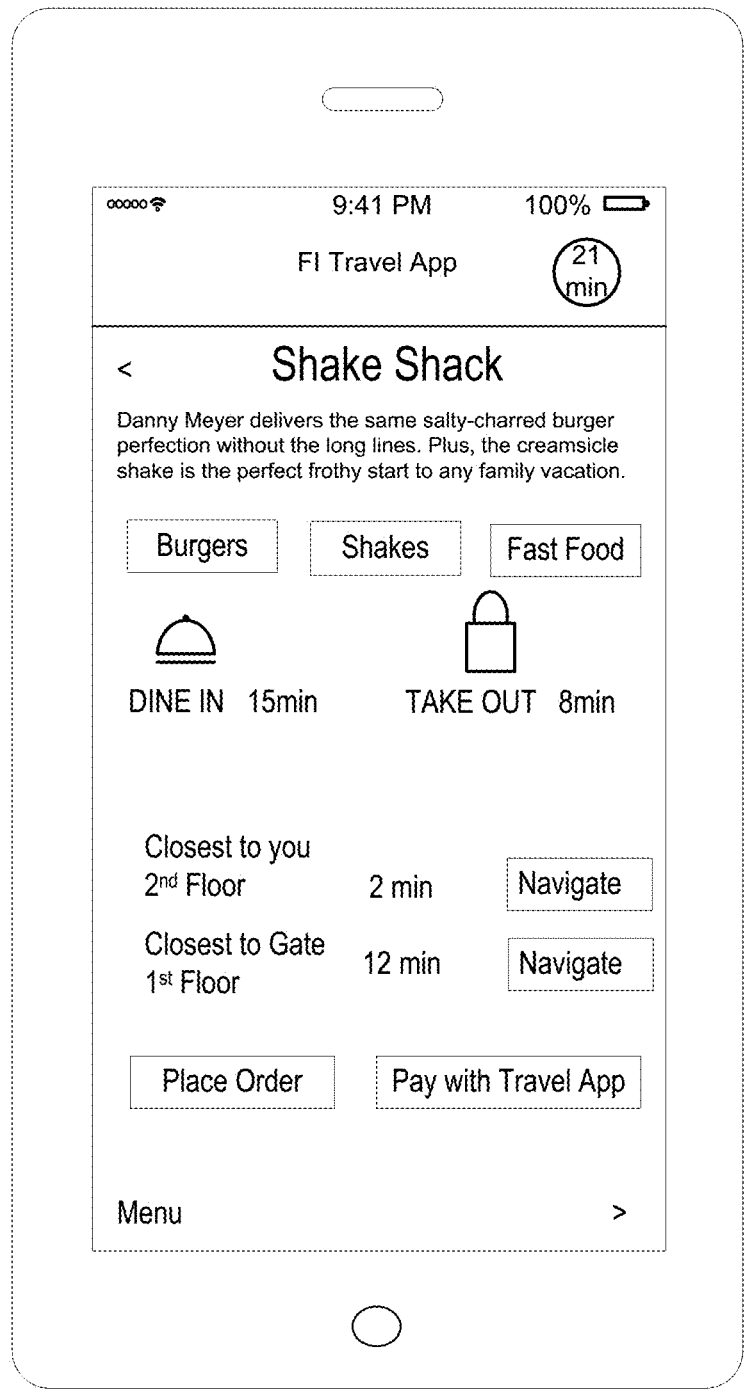
FIG. 10 is an example of a screen that recommends certain merchants based on the customer's profile, that offers navigation assistance in the airport, and that allows the customer to order products from the merchant using his or her mobile device.

An example of that screen is shown in FIG. 10. The screen in FIG. 10 provides additional details on the restaurant, including links to menu items (burgers, shakes, fast food), as well as information on timing for dining in or take out. The screen provided by the travel app provides navigation information and assistance, including, in this example, a first option to go to the restaurant closest to the customer's current location and a second option to go to the restaurant closest to the gate. If the customer taps the "Navigate" button, the travel app can provides navigation assistance with a map of the airport, directions on the map as the customer walks, and audible directions to guide the traveler to the restaurant.

The travel app also allows the customer to place an order ahead of time and to pay with the travel app. For example, if the customer taps "Place Order," the travel app may present the menu and receive the customer's selections. If the customer taps "Pay with Travel App," the travel app may allow the customer to authorize a charge to a credit card account that the customer has established with a financial institution.

Figure 11:
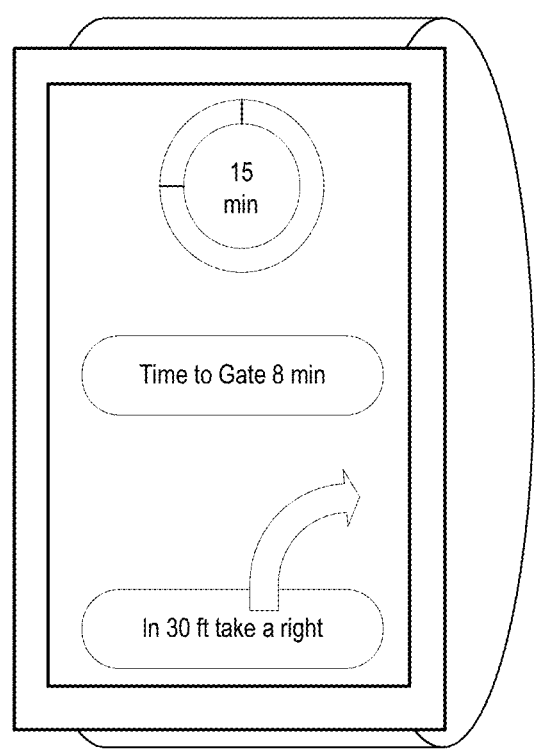
FIG. 11 is an example of a travel app loaded onto a smart watch and displaying a navigation function.

FIG. 11 shows another embodiment of the invention in the form of a smart watch. In addition to operating on a customer's mobile phone or tablet computer, the travel app can be designed to operate on a smart watch or other mobile device with a suitable screen and input/output interface. FIG. 11 depicts one such example in which the travel app displays the time until boarding (15 minutes), the walking time to the gate (8 minutes), and directions to the gate. The information provided by the travel app, either via a smart watch, a mobile phone, or a tablet computer, can assist the customer with finding the gate. The screen of the travel app can also alert the customer that a recent purchase has been made at Shake Shack using the customer's travel app, and the amount of the purchase.

Figure 12:
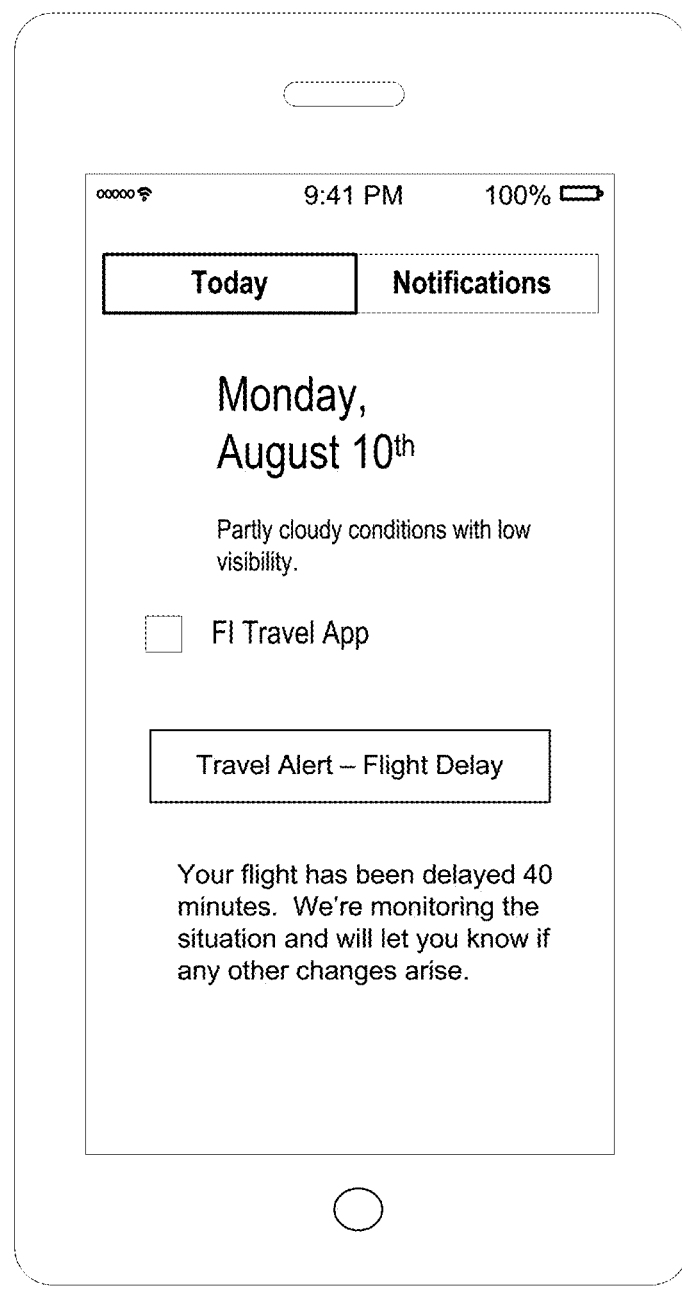
FIG. 12 is an example of a push notification informing the customer that his or her flight has been delayed.
Figure 13:
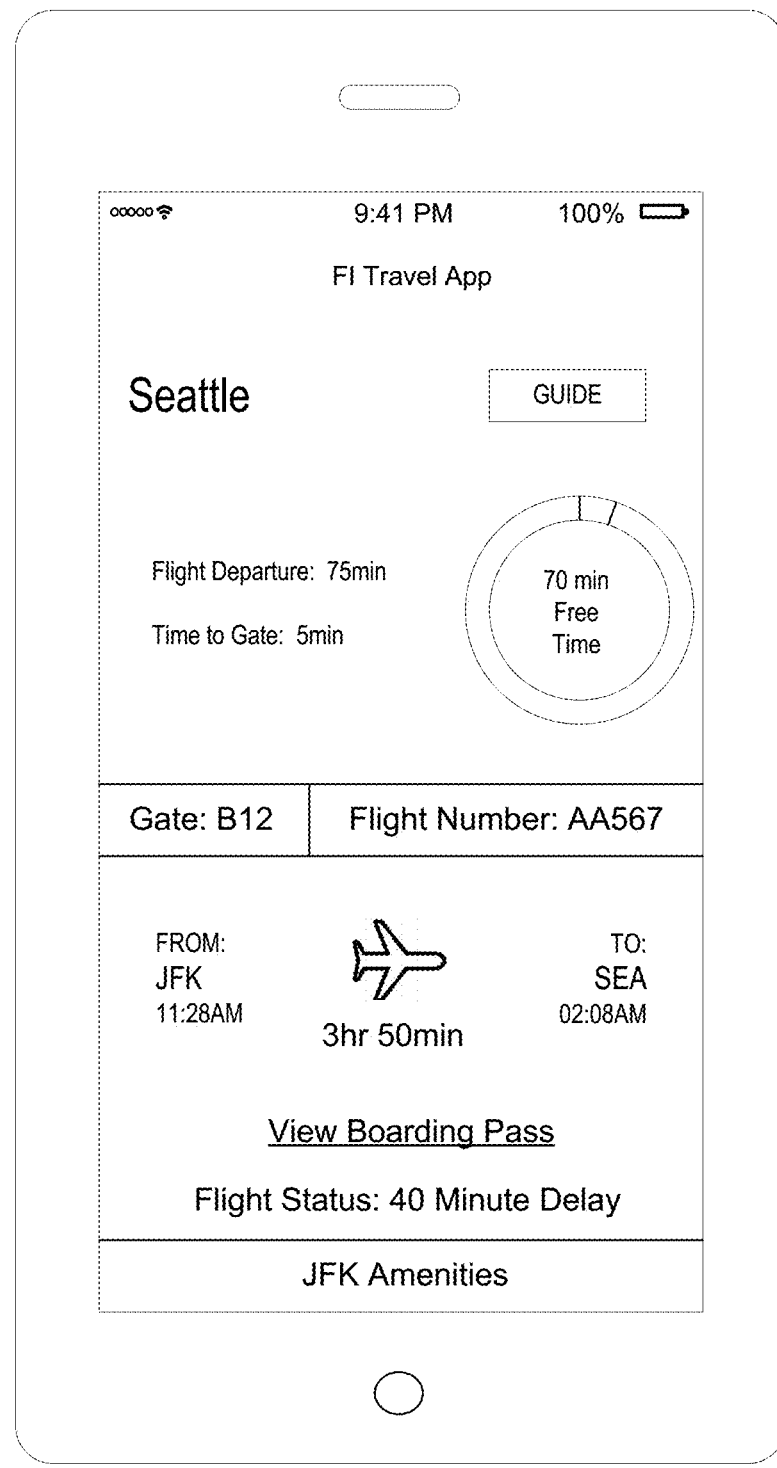
FIG. 13 is an example of an updated status screen reflecting that the flight has been delayed and the additional free time available until departure.

According to another aspect of the invention, the travel app can monitor data sources such as FlightStats that provide flight status information, and can alert the customer to a flight delay or cancellation. As shown in FIG. 12, the travel app sends a push notification to the customer alerting the customer that the flight has been delayed by 40 minutes according to one example. The notification indicates that the travel app of the financial institution will monitor the situation in the event that more changes occur, or if any other action is necessary. FIG. 13 shows an example of a screen provided by the travel app with update timing information. As shown in FIG. 13, the flight departure has been updated to reflect a 40 minute delay in the flight departure time, the free time has been updated, and the flight status has been updated to reflect this delay.

Figure 14:
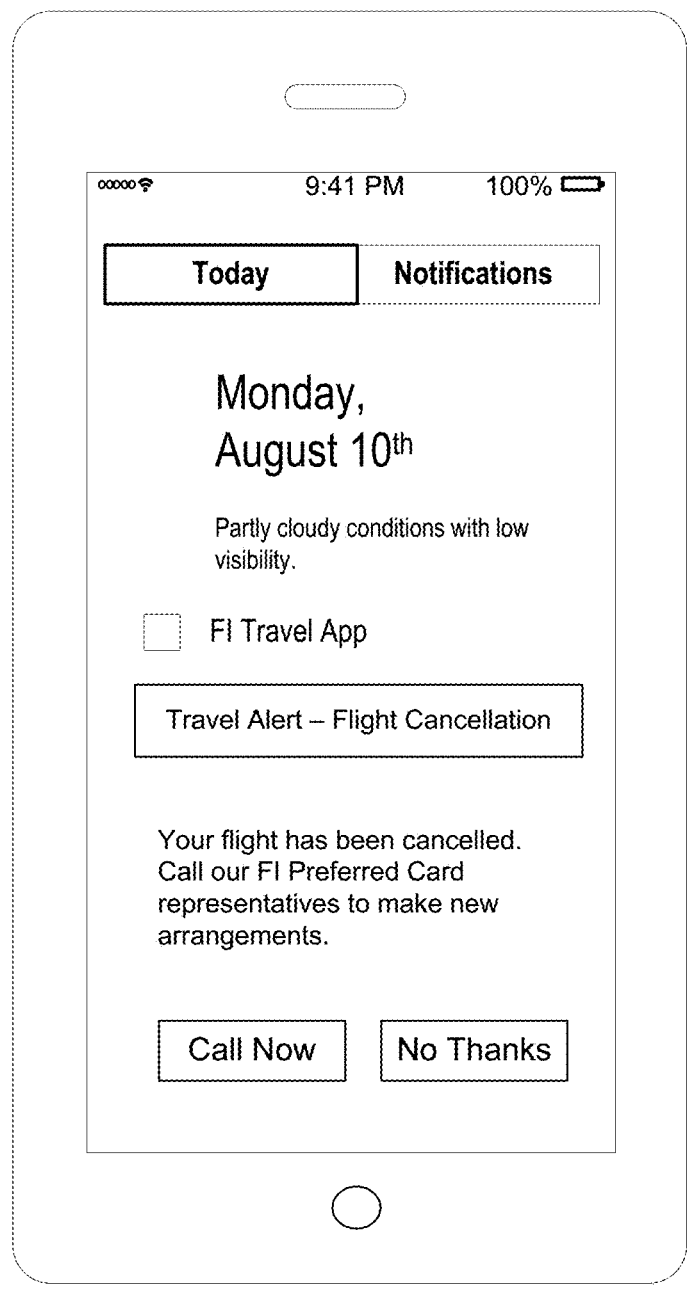
FIG. 14 is an example of a screen informing the customer that his or her flight has been canceled and offering a link to a customer service representative of the financial institution who can assist with booking another flight for the customer.

FIG. 14 shows another example of a push notification that the travel app can provide, in this case to notify the customer that the flight has been cancelled. The travel app may provide access to a customer service representative from a rewards program or preferred customer program of the financial institution to assist the customer with making new travel arrangements. As shown in FIG. 14, the travel app screen presents a first button labeled "Call Now" and a second button labeled "No Thanks." The travel app thus can immediately offer to provide assistance with disappointing travel circumstances and thereby generate goodwill with the customer. If the customer elects to call the financial institution, the customer service representative at the financial institution can assist with finding a new flight to the destination and sending updated itineraries to the customer via the travel app.

Figure 15:
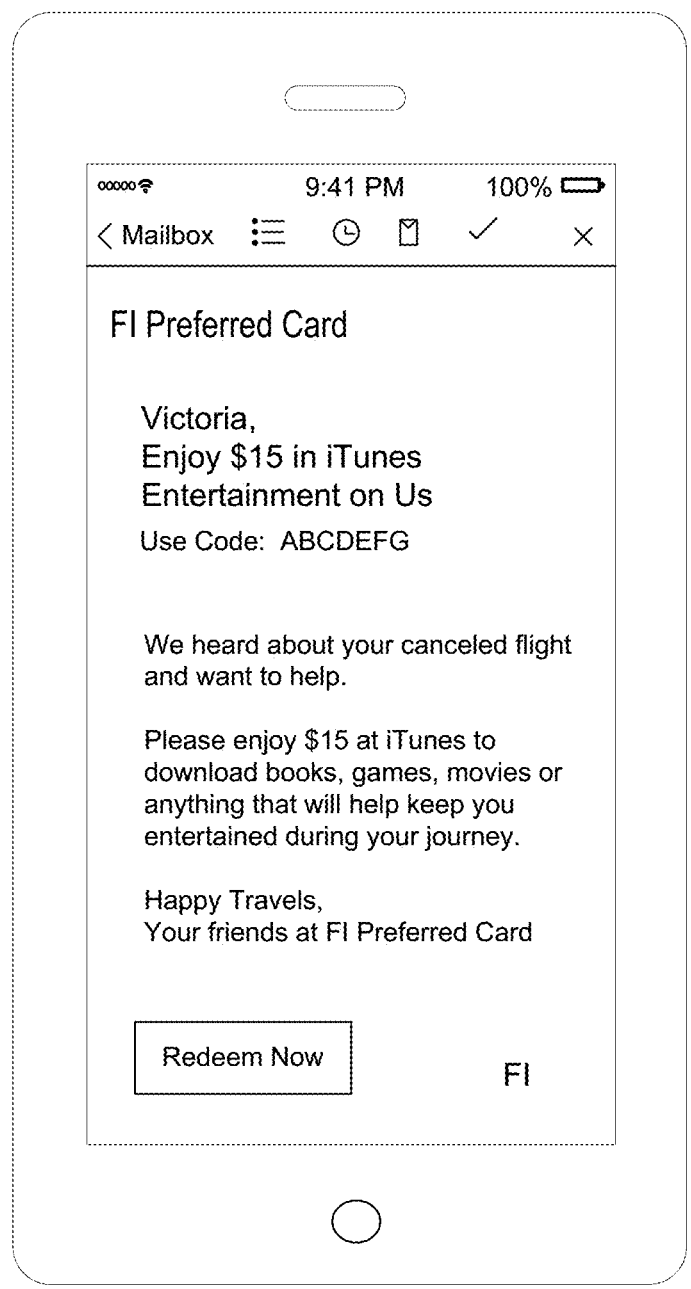
FIG. 15 is an example of a screen offering a free product or service as a result of the flight cancellation.

In addition, the travel app may go a step further by offering a complementary gift at a time of disappointment (e.g., cancelled flight). According to one example shown in FIG. 15, the travel app presents the customer with a $15 iTunes gift certificate when the customer's flight is cancelled. The explanation from the travel app associates the free gift certificate with the flight cancellation to send the message to the customer that the financial institution understands the customer's unfortunate situation and is proactively offering assistance to improve it.

The computer implemented system, method and medium described herein can provide the advantage of significantly enhancing customer loyalty to a financial institution or other business, based on the perception that the financial institution is significantly upgrading the customer's experience through the airport and avoiding or improving unfortunate circumstances. By gathering and processing various data sources that are relevant and valuable to the customer, and sending the customer relevant, timely information on merchants, offers, flight timing, assistance with rescheduling, and navigation through the airport, all tailored to the customer, the financial institution can help the customer avoid undesirable circumstances, guide the customer to desirable amenities, and significantly enhance the customer's overall enjoyment of the travel experience.

According to additional embodiments of the invention, the travel app and website of the sponsoring financial institution or other business can be designed to enhance the customer's experience prior to and after arriving at the airport. For example, the financial institution may provide a website and travel app that allows the customer to pre-order premium services when booking travel with a rewards program of the financial institution. The travel app may also provide a step-by-step itinerary from door-to-door to assist the customer with the entire trip by providing relevant push notifications and other similar services, tailored information, and offers for the customer. The travel app may include a link, available throughout the entire trip, to a customer service representative of the financial institution, to assist with any unplanned events. This customer service representative can assist with any and all aspects of the travel including but not limited to forgotten items, missing luggage, etc. The travel app may connect with other services (such as car services or baggage ship ahead services) to allow for a highly desirable travel experience. The travel app connection to the services can pass along payment and profile information to the services so that the customer can effortlessly use these services.

Although the foregoing description has focused primarily on a financial institution assembling relevant data sets, processing the data, and sending the relevant data at appropriate times to its customer, the system may be operated and maintained by other types of commercial entities who may configure the system to provide similar advantages to their customers. In additional, while the foregoing description has focused primarily on the customer's travel through an airport, the principles of the invention can be applied to other travel environments where the operating entity can assemble and provide relevant, timely information to its customers to enhance their experience.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of a mobile device 131 and a personal computing device 133 are shown in FIG. 1, exemplary embodiments of the invention may utilize other types of communication devices whereby a user may interact with a network that transmits and delivers data and information used by the various systems and methods described herein. The mobile device and personal computing device may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The mobile device 131 and personal computing device 133 may include various connections such as a cell phone connection, WiFi connection, Bluetooth connection, satellite network connection, and/or near field communication (NFC) connection, for example.

As described above, FIG. 1 includes a number of servers 120, 126, 128, 140, 142, 144 and user communication devices 131, 133, 135, 139, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (Saas), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

In the system and method of exemplary embodiments of the invention, a variety of "user interfaces" may be utilized to allow a user to interface with the mobile devices 131, 135, 139 or personal computing device 133. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:
1. A computer-implemented method for providing travel information to a mobile device of a customer of a business, the method comprising:
  acquiring customer profile data, from a profile database, wherein the customer profile data comprises historical data on financial transactions executed by the customer, the historical data on financial transactions including businesses with which the customer has made transactions, transactions amounts, and customer credit-worthiness;

acquiring customer location data from a global positioning system in the customer's mobile device;

acquiring airport map and amenities location data within an airport, from an airport database, wherein the amenities comprise a plurality of merchants;

acquiring flight status data, from an airline flight server, for a flight at the airport booked by the customer;

acquiring product availability data from at least one of the plurality of merchants, from a merchant server;

communicating to the user device a first data set to the customer's mobile device after the customer arrives at the airport, wherein, based on the flight status data, customer location data, and the airport map data, the first data set provides a departure time for the flight and a travel time period from a current location of the customer to a location of a departure gate;

communicating to the user device a second data set to the customer's mobile device, wherein, based on the airline map and amenities location data, the customer location data, the flight status data, the profile data, and the merchant server data, the second data set identifies amenities located at the customer's current location, located along a route from the customer's current location to the departure gate, and located at the departure gate, and wherein the amenities are targeted based on the customer profile data, including consideration of businesses where the customer has spent money in the past, the amount of money spent at such businesses, and the amount of time remaining between a current time and the departure time of the flight in the first data set and a customer's selection between two options consisting of a preference for arriving at the airport right on time or with plenty of time to spare;

communicating to the user device a third data set to the customer's mobile device, wherein, based on the airline map and amenities location data, the customer location data, the flight status data, the profile data, and the merchant server data, the third data set comprises merchant product availability information based at least in part on the amount of time remaining between the current time and the departure time of the flight in the first data set, and an invitation for the customer to order the product; and receiving from the customer an order for the product and an authorization to charge an account at a financial institution;

communicating with a financial server to transmit the user charge authorization and receive approval of the authorized charge by the financial institution; and communicating with the merchant server to relay the order to the merchant, thereby triggering the merchant to prepare the purchased goods.

2. The method of claim 1, wherein the customer profile data further comprises customer responses to a plurality of questions on travel preferences.

3. The method of claim 1, wherein the invitation to order the product includes an option to request the product be delivered to the customer's departure gate.

4. The method of claim 1, further comprising transmitting a fourth data set to the customer's mobile device, wherein the fourth data set includes updated flight status information comprising a delay time for the flight.

5. The method of claim 1, further comprising transmitting a fourth data set to the customer's mobile device, wherein the fourth data set includes a notice that the flight has been cancelled, and the method further comprises transmitting to the customer a link to a customer service representative of the financial institution.

6. The method of claim 5, further comprising transmitting notice to the customer's mobile device that the customer has been given a complementary product or service as a result of the flight cancellation.

7. A system for providing travel information to a mobile device of a customer of a business, the system comprising:

a server, communicatively coupled to a network, comprising at least one processor and at least one memory, the server being configured to:

acquire customer profile data, from a profile database, wherein the customer profile data comprises historical data on financial transactions executed by the customer, the historical data on financial transactions including businesses with which the customer has made transactions, transactions amounts, and customer credit-worthiness;

acquire customer location data from a global positioning system in the customer's mobile device;

acquire airport map and amenities location data within an airport, from an airport database, wherein the amenities comprise a plurality of merchants;

acquire flight status data, from an airline flight server, for a flight at the airport booked by the customer;

acquire product availability data from at least one of the plurality of merchants, from a merchant server;

create a first data set, based on the flight status data, customer location data, and the airport map data, wherein the first data set comprises a departure time for the flight and a travel time period from a current location of the customer to a location of a departure gate;

communicate to the user device the first data set after the customer arrives at the airport;

create a second data set based on the airline map and amenities location data, the customer location data, the flight status data, the profile data, and the merchant server data, wherein the second data set identifies amenities located at the customer's current location, located along a route from the customer's current location to the departure gate, and located at the departure gate, and wherein the amenities are targeted based on the customer profile data, including consideration of businesses where the customer has spent money in the past, the amount of money spent at such businesses, and the amount of time remaining between a current time and the departure time of the flight in the first data set and a customer's selection between two options consisting of a preference for arriving at the airport right on time or with plenty of time to spare;

communicate to the user device the second data set;

create a third data set based on the airline map and amenities location data, the customer location data, the flight status data, the profile data, and the merchant server data, wherein the third data set comprises merchant product availability information based at least in part on the amount of time remaining between the current time and the departure time of the flight in the first data set, and an invitation for the customer to order the product;

communicate to the user device the third data set; and receive from the customer an order for the product and an authorization to charge an account at a financial institution;

communicate with a financial server to transmit the user charge authorization and receive approval of the authorized charge by the financial institution; and communicate with the merchant server to relay the order to the merchant, thereby triggering the merchant to prepare the purchased goods.

8. The system of claim 7, wherein the customer profile data further comprises customer responses to a plurality of questions on travel preferences.

9. The system of claim 7, wherein the invitation to order the product includes an option to request the product be delivered to the customer's departure gate.

10. The system of claim 7, further comprising:

the computer processor performing processing to create a fourth data set, wherein the fourth data set includes updated flight status information comprising a delay time for the flight; and the server being further configured to transmit the fourth data set to the customer's mobile device.

11. The system of claim 7, further comprising:

the computer processor performing processing to create a fourth data set, wherein the fourth data set includes a notice that the flight has been cancelled, and the method further comprises transmitting to the customer a link to a customer service representative of the financial institution; and the server being further configured to transmit the fourth data set to the customer's mobile device.

12. The system of claim 11, further comprising the server being further configured to transmit notice to the customer's mobile device that the customer has been given a complementary product or service as a result of the flight cancellation.

13. A non-transitory computer readable medium that provides travel information to a mobile device of a customer of a business, the non-transitory computer readable medium comprising code for:

acquiring customer profile data, from a profile database, wherein the customer profile data comprises historical data on financial transactions executed by the customer, the historical data on financial transactions including businesses with which the customer has made transactions, transactions amounts, and customer credit-worthiness;

acquiring customer location data from a global positioning system in the customer's mobile device;

acquiring airport map and amenities location data within an airport, from an airport database, wherein the amenities comprise a plurality of merchants;

acquiring flight status data, from an airline flight server, for a flight at the airport booked by the customer;

acquiring product availability data from at least one of the plurality of merchants, from a merchant server;

generating a first data set based on the flight status data, customer location data, and the airport map data, wherein the data set comprises a departure time for the flight and a travel time period from a current location of the customer to a location of a departure gate;

communicating to the user device the first data set after the customer arrives at the airport;

generating a second data set based on the airline map and amenities location data, the customer location data, the flight status data, the profile data, and the merchant server data, wherein, the second data set identifies amenities located at the customer's current location, located along a route from the customer's current location to the departure gate, and located at the departure gate, and wherein the amenities are targeted based on the customer profile data, including consideration of businesses where the customer has spent money in the past, the amount of money spent at such businesses, and the amount of time remaining between a current time and the departure time of the flight in the first data set and a customer's selection between two options consisting of a preference for arriving at the airport right on time or with plenty of time to spare;

communicating to the user device the second data set;

generating a third data set based on the airline map and amenities location data, the customer location data, the flight status data, the profile data, and the merchant server data, wherein the third data set comprises merchant product availability information based at least in part on the amount of time remaining between the current time and the departure time of the flight in the first data set, and an invitation for the customer to order the product;

communicating to the user device the third data set; and receiving from the customer an order for the product and an authorization to charge an account at a financial institution;

communicating with a financial server to transmit the user charge authorization and receive approval of the authorized charge by the financial institution; and communicating with the merchant server to relay the order to the merchant, thereby triggering the merchant to prepare the purchased goods.

14. The non-transitory computer readable medium of claim 13, wherein the customer profile data further comprises customer responses to a plurality of questions on travel preferences.

15. The non-transitory computer readable medium of claim 13, wherein the invitation to order the product includes an option to request the product be delivered to the customer's departure gate.

16. The non-transitory computer readable medium of claim 13, further comprising:

generating a fourth data set, wherein the fourth data set includes updated flight status information comprising a delay time for the flight; and transmitting the fourth data set to the customer's mobile device.

17. The non-transitory computer readable medium of claim 13, further comprising:

generating a fourth data set, wherein the fourth data set includes a notice that the flight has been cancelled, and the method further comprises transmitting to the customer a link to a customer service representative of the financial institution; and transmitting the fourth data set to the customer's mobile device.

18. The non-transitory computer readable medium of claim 17, further comprising transmitting notice to the customer's mobile device that the customer has been given a complementary product or service as a result of the flight cancellation.

* * * * *